(12) United States Patent
Griffin et al.

(10) Patent No.: US 9,602,760 B2
(45) Date of Patent: Mar. 21, 2017

(54) MODULAR DISPLAY MONITOR

(75) Inventors: Timothy Griffin, Singapore (SG); Seow Kwang Steven Foo, Singapore (SG); Kok Chin Billy Leong, Singapore (SG); Seen Yee Cindy Cheong, Singapore (SG)

(73) Assignee: Dell Products, LP, Round Rock, TX (US)

( * ) Notice: Subject to any disclaimer, the term of this patent is extended or adjusted under 35 U.S.C. 154(b) by 503 days.

(21) Appl. No.: 13/557,905

(22) Filed: Jul. 25, 2012

(65) Prior Publication Data
US 2014/0028923 A1 Jan. 30, 2014

(51) Int. Cl.
*H04N 5/64* (2006.01)
*G06F 1/16* (2006.01)

(52) U.S. Cl.
CPC ............ *H04N 5/64* (2013.01); *G06F 1/1601* (2013.01)

(58) Field of Classification Search
CPC .. H04N 5/655; H04N 5/64; G09F 9/00; G06F 1/1616; G06F 1/1654; G06F 1/1601

USPC ....... 348/839, 836, 794; 361/679.21–679.61, 361/728, 747
See application file for complete search history.

(56) References Cited

U.S. PATENT DOCUMENTS

| | | | |
|---|---|---|---|
| 7,159,053 B1 * | 1/2007 | Lakin | 710/62 |
| 7,804,672 B2 | 9/2010 | Tonry et al. | |
| 2010/0082859 A1 * | 4/2010 | Hendry et al. | 710/60 |
| 2011/0286171 A1 | 11/2011 | Franz et al. | |

* cited by examiner

*Primary Examiner* — Michael Lee
(74) *Attorney, Agent, or Firm* — Prol Intellectual Property Law, PLLC; H. Kenneth Prol (57) ABSTRACT

A modular display monitor system includes an interchangeable display panel with a panel interface and an interchangeable connector module that has a connecting dock and a connector for interfacing with the panel interface. The system further includes an interchangeable monitor riser with a mounting mechanism attached to the interchangeable connector module. The system processes electronics to video input data for display by the display panel.

20 Claims, 5 Drawing Sheets

MODULAR DISPLAY MONITOR

FIELD OF THE DISCLOSURE

This disclosure relates generally to information handling systems, and more particularly relates to modular monitor displays for use with information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system may include a large number of individual servers and associated storage and peripheral devices. Among the peripheral devices, typically an information handling system includes a display for displaying information from the information handling system to the user. Displays may be of a variety of types including a liquid crystal display (LCD), an organic light emitting diode (OLED), a flat panel display, plasma display panel (PDP), a solid state display, or a cathode ray tube (CRT).

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
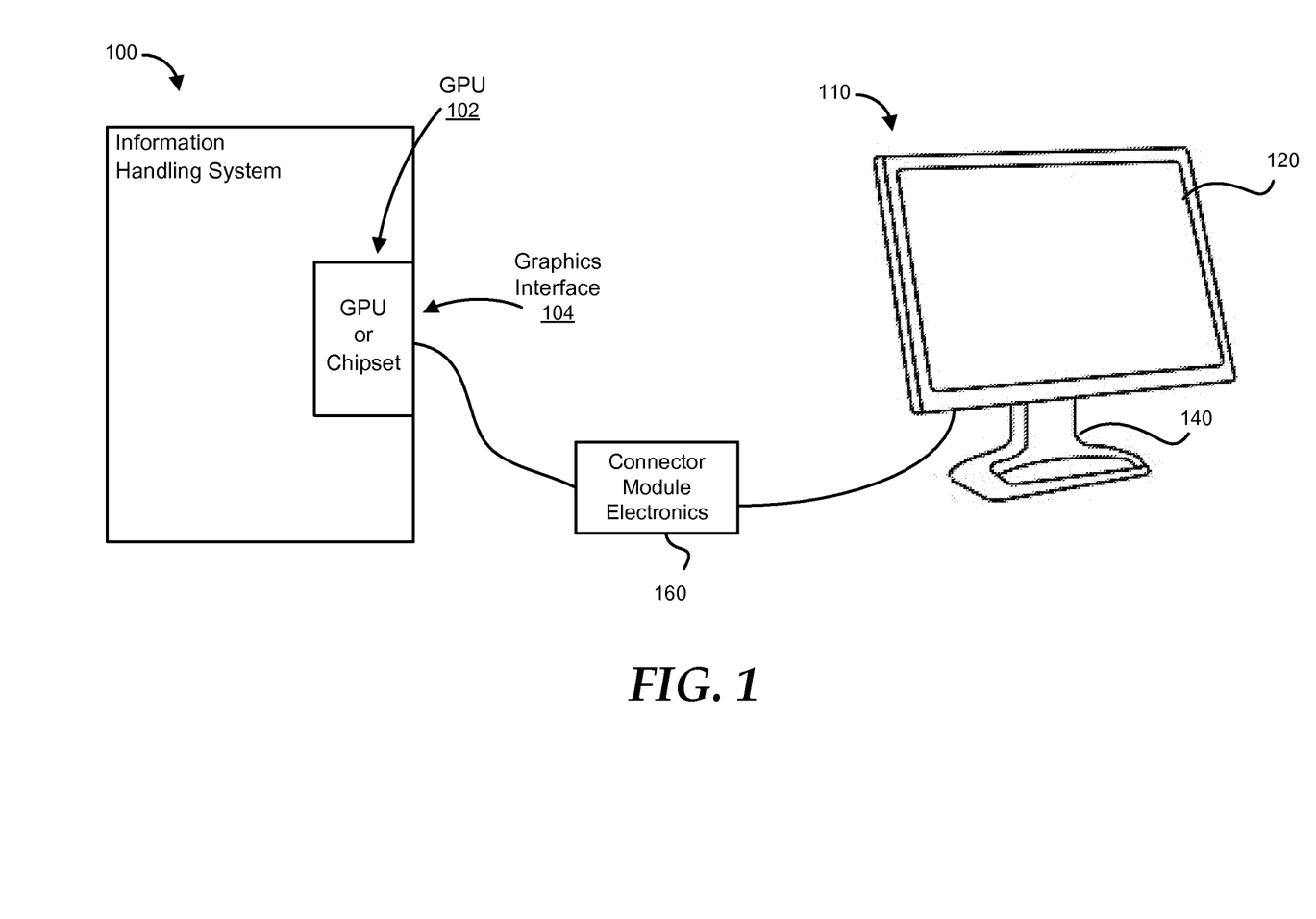
FIG. 1 is a diagram illustrating an information handling system in accordance with a specific embodiment of the present disclosure.

FIG. 1 illustrates an information handling system 100 used with a modular display monitor 110 in accordance with at least one embodiment of the present disclosure. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. The information handling system 100 may include memory, one or more processing resources such as a central processing unit (CPU) or hardware or software control logic. The information handling system 100 may further include video processing resources such as a graphics processing unit (GPU) or chipset 102 and a graphics interface 104. Additional components of the information handling system may include one or more storage devices, one or more communications ports for communicating with external devices as well as various input and output (I/O) devices, such as a keyboard, a mouse, and a video display 110. The information handling system may also include one or more buses operable to transmit communications between the various hardware components. Further detail of an illustrative embodiment of the information handling system may be found below in the description of FIG. 5.

For the purpose of illustration, information handling system 100 is described in an example context as connected a modular display monitor 110. Modular display monitor 110 may be configured in several ways without departing from the scope of the present disclosure. By way of illustration, modular display monitor 110 includes an interchangeable display panel 120, an interchangeable monitor riser or stand 140, and an interchangeable connector module 160 containing a portion of the display control and processing electronics for the display panel. In one embodiment, a portion of the display control and processing elements of the display panel 120 are housed in the interchangeable connector module 160. Interchangeable connector module 160 can be implemented in hardware, software, or any combination thereof. The interchangeable connector module 160 may include one or more controllers, drivers, memory, data format converters, A/D converters, power conversion circuits, and firmware or software to perform different tasks of providing input video data to the interchangeable display panel for display. Upon receiving video input data from the information handling system 100 the interchangeable connector module 160 prepares the video input data to drive the interchangeable display 120 to display the image or images. The interchangeable connector module 160 transmits a panel signal to the interchangeable display 120. The panel signal may be of a format such as Embedded DisplayPort (eDP), DisplayPort (DP), Low-Voltage Differential Signaling (LVDS), or a similar display signaling format. eDP is a high-speed display signaling format embodied and described by the VESA eDP 1.3 standard for example. DP is a high-speed display signaling format embodied and described by the VESA DP 1.2 standard for example. LVDS is a high-speed display signaling format embodied and described by the ANSI 644-A standard.

Figure 2:
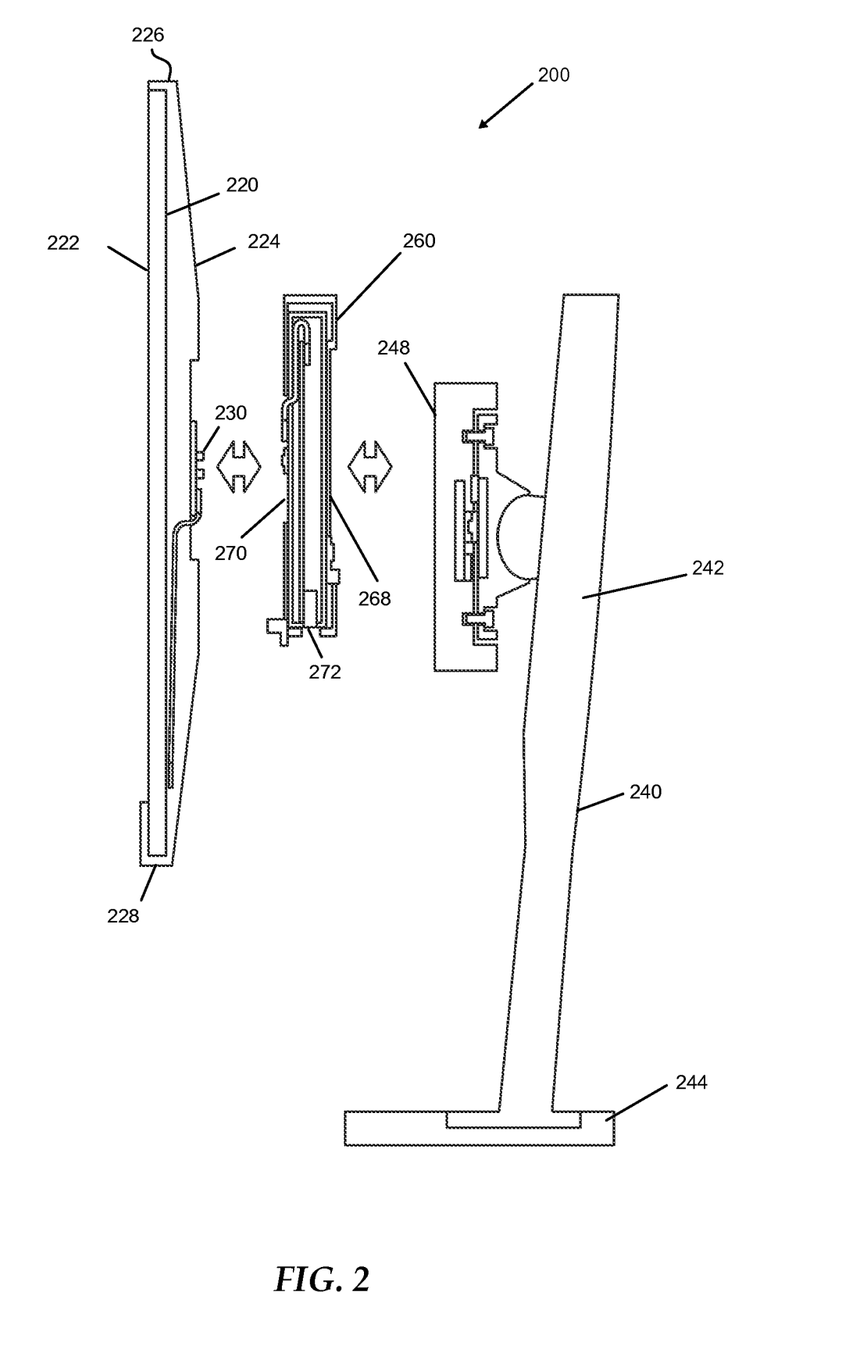
FIG. 2 is a diagram illustrating a modular display monitor system in accordance with a specific embodiment of the present disclosure.
Figure 3:
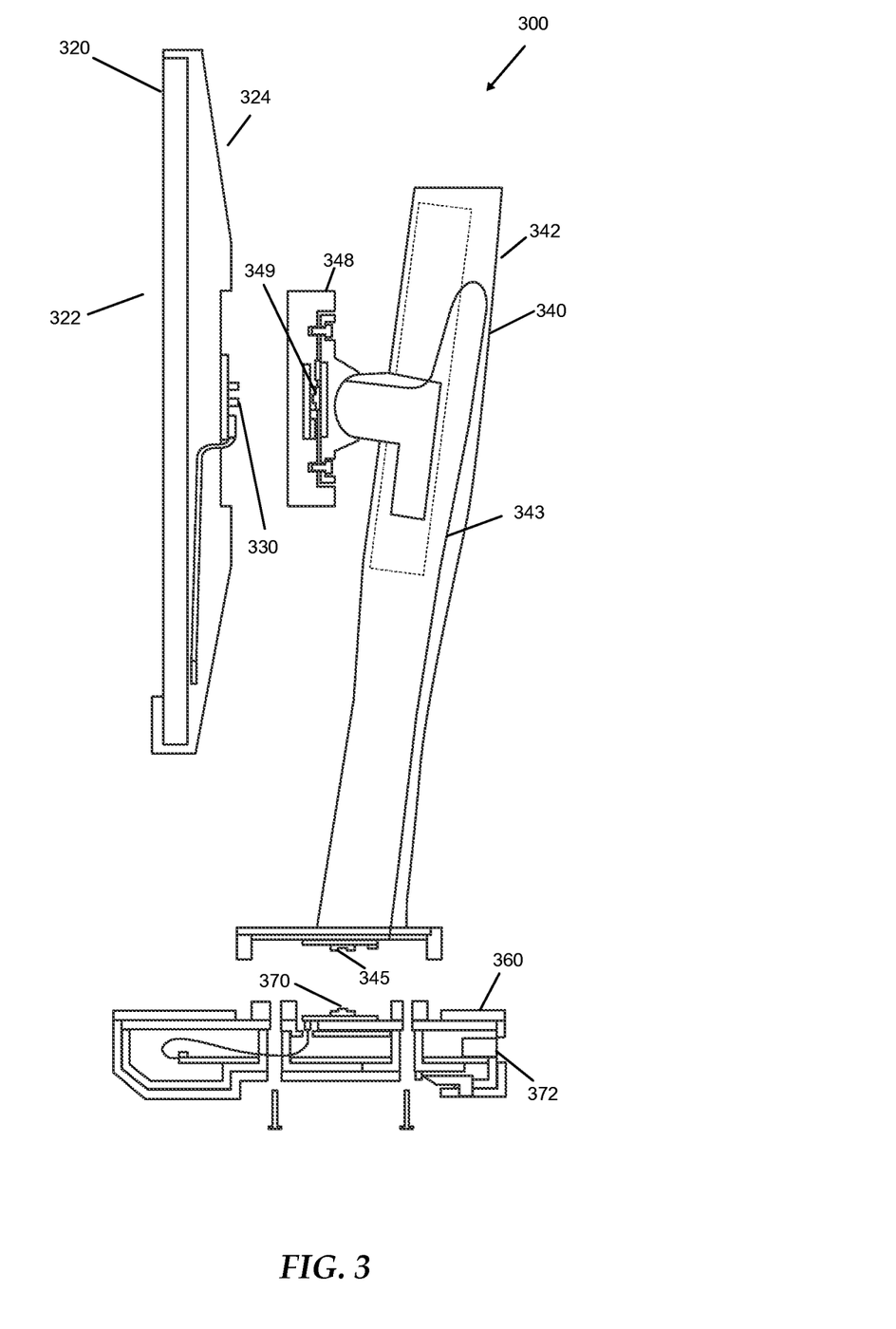
FIG. 3 is a diagram illustrating a modular display monitor system in accordance with a specific embodiment of the present disclosure.
Figure 4:
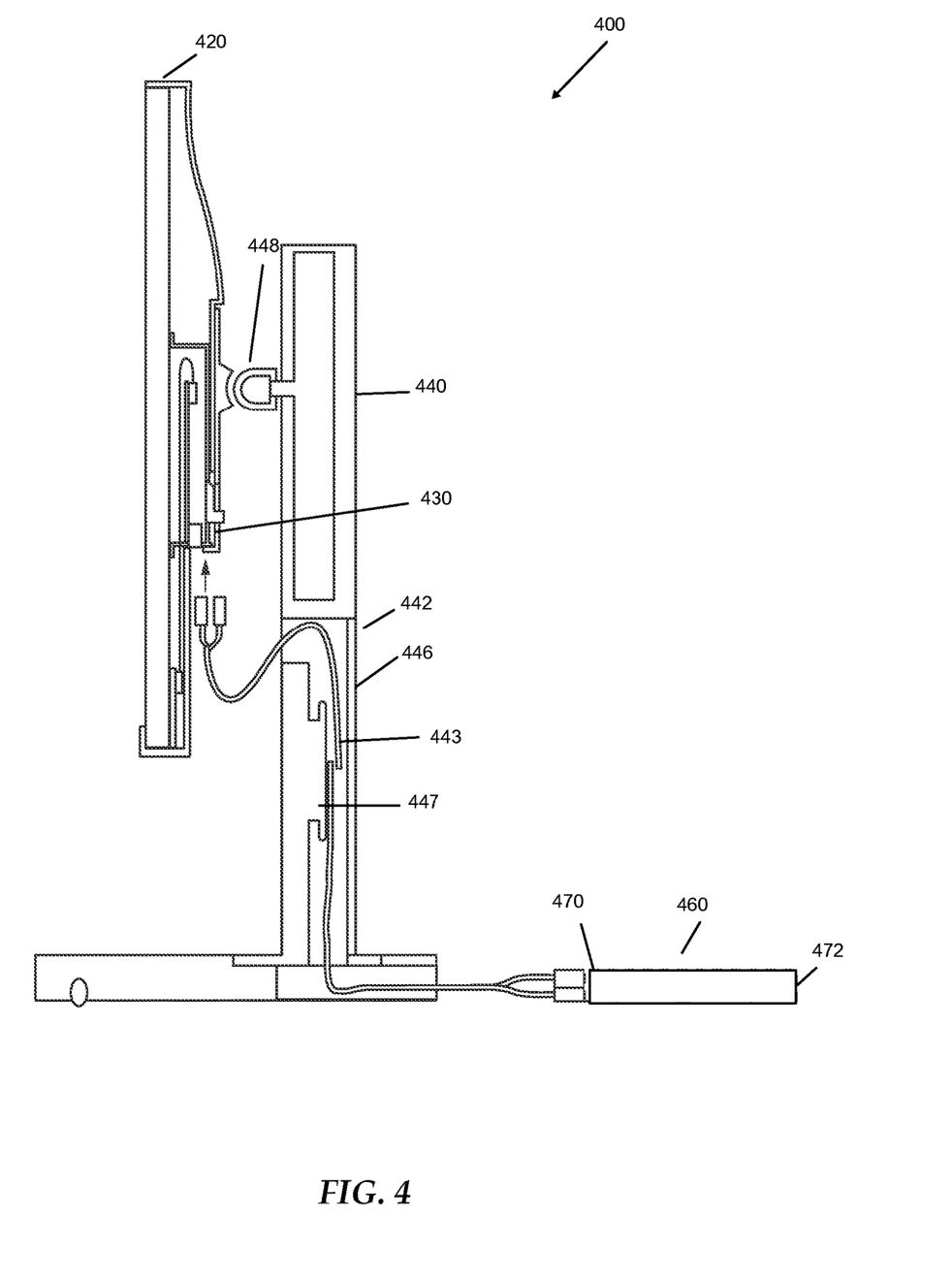
FIG. 4 is a diagram illustrating a modular display monitor system in accordance with a specific embodiment of the present disclosure.

Referring now to FIGS. 2, 3 and 4, embodiment variations of a modular display monitor system 110 are illustrated. Referring to FIG. 2, the exemplary modular display monitor system 200 includes an interchangeable display panel 220 having a front surface 222 with a viewable display surface, a rear surface 224 located opposite the front surface 222 and having a panel interface 230 for connecting to a connector module 260. The interchangeable display panel 220 also has a top edge 226 extending between the front surface 222 and the rear surface 224, a bottom edge 228 located opposite from the top edge 226 and extending between the front surface 222 and the rear surface 224, and a pair of opposing side edges that extend between the front surface 222, the rear surface 224, the top edge 226, and the bottom edge 228.

In one embodiment, the panel interface 230 contains a PCB board-to-board interface between the interchangeable display panel 220 and the connector module 260. The board-to-board interface may be arranged either with a male connector or a female connector on the panel interface side 230. The panel interface 230 receives video panel signals from the connector module 260. Those panel signals are transmitted to the display panel 220 to display the image. Although a portion of control and processing electronics are housed in the connector module 260, certain electronics remain in the interchangeable display panel. For example, if the display panel 220 is an LCD panel, timing controller (t-con), row and column drivers, and backlight drivers remain in the display panel 220 housing. Similar limited control and driver electronics will remain in display panels of a different type such as PDP or OLED. The display panel 220 receives panel signals from the connection module 260 in DisplayPort (DP) or Embedded DisplayPort (eDP) format. In an embodiment, the interchangeable display panel 220 may be the interchangeable display panel 120, described above with reference to FIG. 1, and may be part of the modular display module 110.

Exemplary modular display monitor system 200 of FIG. 2 has an interchangeable monitor riser 240. The depicted embodiment shows a height adjustable column 242 with base 244 and connecting mechanism 248. Several mechanisms for height adjustment of the monitor or riser 240 are possible. The connecting mechanism 248 is a structure onto which the interchangeable connector module 260 is attached. The interchangeable connector module 260 is interposed between the connecting mechanism 248 and the display panel 220. Thus, the connecting mechanism 248 of the interchangeable riser 240 supports both the interchangeable connector module 260 and the interchangeable display panel 220. In alternative embodiments described below, the interchangeable display panel 220 may attach directly to the connecting mechanism 248. The connecting mechanism 248 may have tilt or swivel capabilities to enable the viewing orientation of the interchangeable display panel to be changed. The connecting mechanism 248 may also have a data and power interface to supply the interchangeable connector module 260 and the interchangeable display panel 220

Shown is a system wherein the height adjustment is a mechanism housed within the column 242 and may be controlled or facilitated by weight bearing structures such as springs, pistons, a telescoping column, or similar structures. In an alternative embodiment, a low-cost riser stand may be used. This may have no height or viewing orientation adjustment or limited adjustment capabilities. Use of such a low-cost riser may be desirable to reduce the overall cost of the monitor system when adjustability of the riser 240 is not desired. In yet another embodiment, the riser 240 may be a reticulating arm instead. The modularity of the interchangeable monitor riser 240 allows a user to upgrade or modify how the flat panel display system 200 is supported in the environment it is used. Replacement of the display panel 220 or connector module electronics 260 is unnecessary when a change is made to the monitor stand 240. Alternatively, a manufacturer may easily make changes to flat panel systems 200 products. A change or upgrade to the type of riser 240 used may be made while using the same display panel 220 or connector module electronics 260 as that used in other monitor systems offered. Implementing new monitor riser 240 designs is easier without having to re-specify an entirely new monitor product roadmap.

The interchangeable monitor riser 240 is connectable to an interchangeable connector module 260 via a mounting mechanism 248. The mounting mechanism 248 may be adjustable as well. For example, the mounting mechanism 248 may have a tilt or swivel feature to allow the viewing of the display panel to be altered. The mounting mechanism 248 attaches to the interchangeable connector module 260 via a quick-release snap-on mechanism such as the Dell quick release (QR) system. Alternatively, other methods such as attachment screws may be used to attach the interchangeable connector module 260 to the mounting mechanism 248.

Exemplary modular display monitor system 200 of FIG. 2 has an interchangeable connector module 260. The interchangeable connector module 260 may contain a substantial portion of control and processing electronics for the display panel. The control and processing electronics housed in the interchangeable connector module may include circuitry for video decoding, frame rate conversion, image scaling, color decoding, pixel formatting, rendering (OSD or video), frame buffering, gamma correction, analog to digital conversion and other video-related functions. The interchangeable connector module 260 may also contain power adapters to convert AC to DC or DC to DC for use by the display panel 220. Optionally, tuner circuitry or audio circuitry may also be included in the interchangeable connector module 260 as well. Locating control and processing electronics for the display panel 220 in a separately disposed module 260 permits the modular display monitor system 200 to be easily upgradeable. Should the display panel 220 need to be upgraded or replaced, such as for a larger or higher resolution panel, then the separately disposed electronics remain with the monitor riser 240. In that example, only the panel 220 is upgraded. Alternatively, if the display panel control and processing electronics are to be upgraded, the connector module 260 may be replaced with upgraded electronics. This permits the consumer to upgrade, or downgrade, components within the modular display monitor system 200 as desired. Alternatively, the modular system permits manufacturers to redesign modular portions of the display monitor system 200 without having to re-specify the entire monitor system. For example, upgraded control and processing electronics normally found in a display panel 220 may be easily replaced with a new connector module 260 without replacing or re-designing the display panel 220. Likewise, changes to the display will not necessarily require upgrading or redesigning the display and control electronics that reside in the connector module 260.

The interchangeable connector module 260 is disposed between the mounting mechanism 248 and the interchangeable display panel 220. The interchangeable connector module 260 has a rear surface with a connecting dock 268 for attaching to the mounting mechanism 248. The connecting dock 268 comprises the complimentary portion of a quick-release snap-on mechanism to the portion on the mounting mechanism 248. In an alternative embodiment, other methods such as attachment screws may be used to attach the interchangeable connector module 260 to the mounting mechanism 248 via the connecting dock 268. In the shown embodiment, no electronics or wiring are located in the connection point between the connecting dock 268 and the mounting mechanism 248. However, as shown in other embodiments, wiring or an electronic interface is possible at the interface between the mounting mechanism 248 and the connecting dock 268. This could permit wiring to run within or along the column 242 of monitor riser 240.

The interchangeable connector module 260 has a front surface with a connector module interface 270 for attaching to the interchangeable display panel 220. The connector module interface 270, as described above, may be a PCB board-to-board electrical interface complimentary to the board-to-board interface on the panel interface 230. In other words, a male electrical board-to-board interface on panel interface 230 would connect to a female board-to-board interface on the connector module interface 270. This board-to-board interface may be complimentary male and female docking connectors such as used with docking stations and systems. Alternatively, a cable connection such as a male to female plug interface may also be used between panel interface 230 and connector module interface 270. The cable connection may depend upon the type of protocol used to transmit panel signal data from the connector module 260 to the panel interface 230. For example, panel signal data received by the display panel 220 for display may be communicated via DisplayPort (DP) format or Embedded DisplayPort (eDP) format. Thus, a DP or eDP cable may be used to connect to the panel interface 230.

The interchangeable connector module 260 also receives video input data signals from an information handling system. This video input data is transmitted by a GPU or the chipset in the information handling system to the interchangeable connector module 260. The video input data received from the GPU at the interchangeable connector module 260 is prepared for display and forwarded to the display panel 220 via interface 230. The control and processing circuitry housed in the interchangeable connector module may include circuitry for video decoding, frame rate conversion, image scaling, color decoding, pixel formatting, rendering (OSD or video), frame buffering, gamma correction, analog to digital conversion and other video-related functions. The video input data is received from the GPU and graphics interface of the information handling system at the interchangeable connector module 260. This video input data is prepared for display by the interchangeable connector module 260. Then video input data or panel signal is forwarded to the display panel 220 via interfaces 230 and 270.

The interchangeable connector module 260 includes integrated circuit hardware, firmware and software as part of the control and processing circuitry. This control and processing circuitry may include one or more input buffer memories for processing the video input data into panel signals to be transmitted to the interchangeable display panel 220.

The process and control circuitry of the interchangeable connector module 260 may receive and decode the video input signal. Receiving and decoding the video input signal determines the resolution and frame rate of the video input signal received from the information handling system. The video input signal is decoded and prepared to be forwarded to the display panel 220. Based on extended display identification data (EDID) information about the interchangeable display panel 220, the resolution and frame rate associated with the display panel 220 is determined. The process and control circuitry then controls the scalar and frame rate converters by selecting the appropriate scalar factor and frame rate conversion factor. The scalar and frame rate conversion factor are applied to the signal being prepared for transmission. This is done to match the expected frame rate and resolution of the interchangeable display panel 220. Other processing of the video input data may occur in accordance with the functions listed above. The processed video input data signal is then prepared in the transmission format, for example eDP or DP. The panel signal is transmitted to the interchangeable display panel 220 for display.

The video input data may be transmitted to the connector module 260 according to any of a number of standards. For example, the information handling system may be connected via DisplayPort (DP), High Definition Multimedia Interface (HDMI), Digital Visual Interface (DVI), Universal Serial Bus (USB) or similar interface standard. Cabling from the graphics interface of the information handling system may connect to the interchangeable connector module 260 at video input data interface 272. The video input data interface 272 may also be capable of transmitting data to the information handling system from the interchangeable connector module 260 or from the interchangeable display panel 220 via the connector module 260. For example, extended display identification data (EDID) or error data may be transmitted to the information handling system via the video input data interface 272 from the interchangeable connector module 260 or the panel display 220. The video input data interface 272 may be located at any location on the connector module 260. In an alternative embodiment as described above, the information handling system graphics interface may connect to the interchangeable connector module 260 via a video input data 272 at the connector dock 268.

The video data format input to the interchangeable connector module 260 may be according to standards such as DP, HDMI, DVI, USB or similar formats. The output panel signal data transmitted to the interchangeable panel display 220 may be of a different format such as eDP, DP, or LVDS. The interchangeable connector module 260 process and converts the input video data received from the information handling system to the correct panel signal data format before transmission. This conversion may take place passively with a conversion of pin data allocation and an adjustment of voltages appropriate for the output display data format. Alternatively, the process and control circuitry of the interchangeable connector module 260 may reformat the processed data to the new format for transmission to the display panel 220.

Referring now to FIG. 3, another embodiment of a modular display monitor system 300 is illustrated. Exemplary modular display monitor system 300 of FIG. 3 has three modular components; an interchangeable display panel 320, an interchangeable monitor riser 340, and an interchangeable connector module 360. In this embodiment, the interchangeable connector module 360 is disposed in the base of the monitor riser 340.

Referring to FIG. 3, the exemplary modular display monitor system 300 includes an interchangeable display panel 320 having a front surface 322 with a viewable display surface, a rear surface 324 located opposite the front surface 322 and having a panel interface 330 for connecting to an interchangeable monitor riser 340. The interchangeable display panel 320 is similar to that described with respect to FIG. 2. The panel interface 330 may contain a PCB board-to-board interface between the interchangeable display panel 320 and a mounting mechanism 348. The panel interface 330 may be a board-to-board interface arranged with either a male connector or a female connector on the panel interface side 330 and the complimentary connector at a mounting mechanism interface 349. Alternatively, a cable and plug may be used to connect to the panel interface 330.

The interchangeable monitor riser 340 is connectable to the interchangeable display panel 320 via a mounting mechanism 348. The mounting mechanism 348 attaches to the interchangeable display panel 320 via a quick-release snap-on mechanism such as the Dell quick release (QR) system. Alternatively, other methods such as attachment screws may be used to attach the interchangeable display panel 320 to the mounting mechanism 348. As with the example in FIG. 2, the mounting mechanism 348 may be adjustable to tilt or swivel as desired.

The mounting mechanism interface 349 is connected to the base of the interchangeable monitor riser 340 via cable 343. In the base of the interchangeable monitor riser 340, the cable 343 is connected to the interchangeable connector module 360 via a base interface 345. Again, either a male or female data connector may be used at base interface 345. The complimentary connector is used to interface with the connector module interface 370.

Panel interface 330 receives video signals from the interchangeable connector module 360. Those panel signals are transmitted to the display panel 320 to display the image. Although a portion of control and processing electronics are housed in the connector module 360, certain electronics remain in the interchangeable display panel as described with respect to FIG. 2. The display panel 320 receives panel signals from the connection module 360 in DisplayPort (DP) or Embedded DisplayPort (eDP) format.

Exemplary modular display monitor system 300 of FIG. 3 has an interchangeable monitor riser 340. The depicted embodiment shows a height adjustable column 342. Several mechanisms for height adjustment are possible. Shown is a system wherein the height adjustment mechanism is housed within the column 342 and may be controlled or facilitated by weight bearing structures such as springs, pistons, a telescoping column, or similar structures. In an alternative embodiment, a low-cost riser stand or other stand type may be used as described in the similar monitor riser of FIG. 2.

Exemplary modular display monitor system 300 of FIG. 3 has an interchangeable connector module 360 attached as a base to the monitor or riser 340. As with the example in FIG. 2, the interchangeable connector module 360 may contain a substantial portion of control and processing electronics for the display panel. The control and processing electronics housed in the interchangeable connector module may include circuitry for video decoding, frame rate conversion, image scaling, color decoding, pixel formatting, rendering (OSD or video), frame buffering, gamma correction, analog to digital conversion and other video-related functions. The interchangeable connector module 360 in the base may also contain power adapters to convert AC to DC or DC to DC for use by the display panel 320. Optionally, tuner circuitry or audio circuitry may also be included in the interchangeable connector module 360 as well. The interchangeable connector module 360 has a connector interface 370 for attaching to the riser 340. The connector interface 370 may comprise the complimentary portion of a quick-release snap-on mechanism such as the Dell QR system when attaching to the riser 340. In an alternative embodiment the attachment may be made via screws or another type of fastener.

Similar to the connector module of FIG. 2, the interchangeable connector module 360 also receives video input data signals from an information handling system. This video input data is transmitted by a GPU or the chipset in the information handling system to the interchangeable connector module 360. The video input data received from the GPU at the interchangeable connector module 360 and is prepared for display. The video input data or panel signal is forwarded to the display panel 320 via cable 343 and interfaces 345 and 349. The interchangeable connector module 360 may perform processing and control functions on the input video data such as video decoding, frame rate conversion, image scaling, color decoding, pixel formatting, OSD or video rendering, frame buffering, gamma correction, A/D conversion or similar functions as described in more detail above.

The video input data may be transmitted to the connector module 360 according to any of a number of standards. For example, the information handling system may be connected via DisplayPort (DP), High Definition Multimedia Interface (HDMI), Digital Visual Interface (DVI), Universal Serial Bus (USB), or similar interface standard. Cabling from the GPU or chipset graphics interface of the information handling system may connect to the interchangeable connector module 360 at video input data interface 372. The video input data interface 372 may also be capable of transmitting data to the information handling system from the interchangeable connector module 360 or from the interchangeable display panel 320 via the connector module 360 as described above. The video input data interface 372 may be located at any location on the connector module base 360.

The video data format input to the interchangeable connector module 360 may be according to standards such as DP, HDMI, DVI, USB or similar formats. The output panel signal data transmitted to the interchangeable panel display 320 may be of a different format such as eDP, DP, or LVDS. The interchangeable connector module 360 processes and converts the input video data received from the information handling system to the correct panel signal data format before transmission as described above in further detail.

Referring now to FIG. 4, another embodiment of a modular display monitor system 400 is illustrated. Exemplary modular display monitor system 400 of FIG. 4 also has three modular components; an interchangeable display panel 420, an interchangeable monitor riser 440, and an interchangeable connector module 460. In this embodiment, the interchangeable connector module 460 is not attached to the monitor riser 440 and the interchangeable display panel 420 except by data and electrical connection.

The interchangeable display panel 420 is similar to those described in connection with FIGS. 2 and 3. A cable 443 connects the interchangeable display panel 420 to the interchangeable connector module 460. The cable attaches at the panel interface 430. This cable is routed through the monitor riser column 442. The compartment in the riser column 442 has a removable panel 446 and a spool mechanism 447 inside permitting adjustment of the length of cable 443.

The interchangeable monitor riser 440 is attachable to the interchangeable display panel 420 via a mounting mechanism 448. The interchangeable monitor riser 440 may be height adjustable and is similar to the risers described in connection with FIGS. 2 and 3. The mounting mechanism 448 attaches to the interchangeable display panel 420 via a quick-release snap-on mechanism such as the Dell quick release (QR) system. Alternatively, other methods such as attachment screws or other fasteners may be used to attach the interchangeable display panel 420 to the mounting mechanism 448. Also as with the example in FIGS. 2 and 3, the mounting mechanism 448 may be adjustable to tilt or swivel as desired.

Panel interface 430 receives video signals from the interchangeable connector module 460. Those panel signals are transmitted to the display panel 420 to display the image. Although a portion of control and processing electronics are housed in the connector module 460, certain electronics remain in the interchangeable display panel 420 as described with respect to FIGS. 2 and 3. As with the previously described examples, the interchangeable connector module 460 may contain a substantial portion of control and processing electronics for the display panel. The control and processing electronics housed in the interchangeable connector module may include circuitry for video decoding, frame rate conversion, image scaling, color decoding, pixel formatting, rendering (OSD or video), frame buffering, gamma correction, analog to digital conversion and other video-related functions. The interchangeable connector module 360 in the base may also contain power adapters to convert AC to DC or DC to DC for use by the display panel 420. Optionally, tuner circuitry or audio circuitry may also be included in the interchangeable connector module 460 as well. Panel signals are transmitted from the interchangeable connector module 460 to the display panel 420 from the connection module 460 in DisplayPort (DP) or Embedded DisplayPort (eDP) format. Thus, cable 443 may be a DP or eDP cable.

Interchangeable connector module 460 also receives video input data signals from an information handling system where it is prepared for display. The interchangeable connector module 460 performs processing and control functions on the input video data This may include video decoding, frame rate conversion, image scaling, color decoding, pixel formatting, OSD or video rendering, frame buffering, gamma correction, A/D conversion or similar functions as described in more detail above. The video input data is transmitted to the connector module 460 from the information handling system according to any of a number of standards. For example, the information handling system may be connected via DisplayPort (DP), High Definition Multimedia Interface (HDMI), Digital Visual Interface (DVI), Universal Serial Bus (USB) or similar interface formats. Cabling from the graphics interface of the information handling system connects to the interchangeable connector module 460 at video input data interface 472. The video input data interface 472 may also be capable of transmitting data to the information handling system from the interchangeable connector module 460 or from the interchangeable display panel 420 via the connector module 460 as described above. The video input data interface 472 may be located at any location on the interchangeable connector module 460.

The video data format input to the interchangeable connector module 460 may be according to standards such as DP, HDMI, DVI, USB or similar formats. The output panel signal data transmitted to the interchangeable panel display 420 may be of a different format such as eDP, DP, or LVDS. The interchangeable connector module 460 processes and converts the input video data received from the information handling system to the correct panel signal data format before transmission as described above in further detail.

Figure 5:
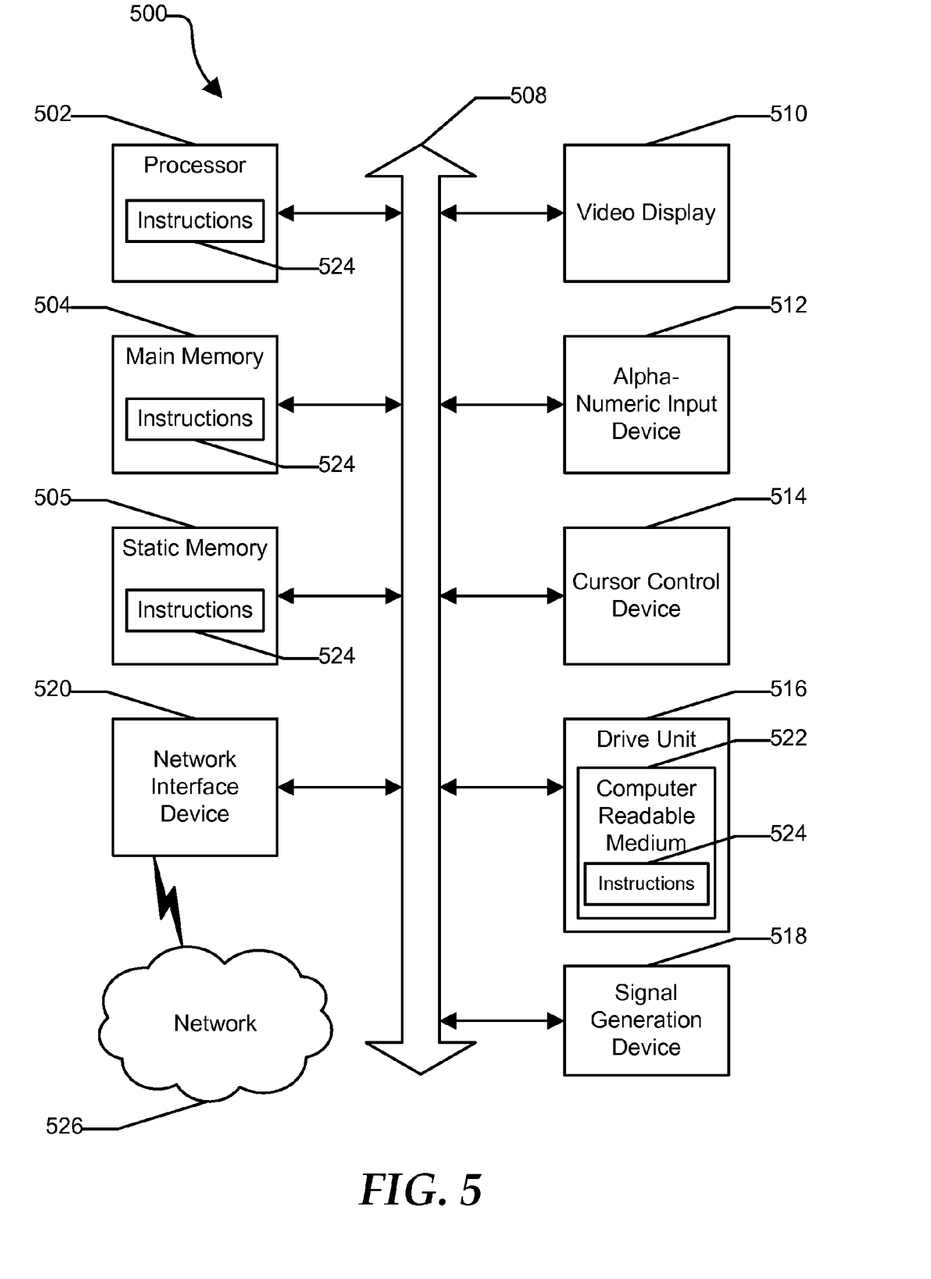
FIG. 5 is a diagram illustrating a general information handling system in accordance with at least one embodiment of the present disclosure.

FIG. 5 shows an illustrative embodiment of an implementation of information handling system 100 as a general computer system 500 in accordance with at least one embodiment of the present disclosure. The computer system 500 can include a set of instructions that can be executed to cause the computer system to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a communications device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, for example, a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, a solid state display, or a cathode ray tube (CRT). The video display unit 510 may include the modular display monitor system described herein including any embodiments disclosed or variations of the same. Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media. The network interface device 520 can provide connectivity to a network 526, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A modular display monitor system comprising:
    an interchangeable display panel having a panel interface and a reduced display panel control and processing capability;
    an interchangeable connector module without a CPU having a connecting dock, and having a connector module interface for interfacing with the panel interface; and
    an interchangeable monitor riser having a mounting mechanism attachable to the interchangeable connector module at the connecting dock;
    wherein the interchangeable connector module is disposed between the mounting mechanism of the interchangeable monitor riser and the interchangeable display, and
    wherein the interchangeable connector module houses components of the display panel control and processing electronics to process video input data received from an operatively connected information handling system having a CPU and to drive display by the interchangeable display panel.

2. The modular display monitor system of claim 1, wherein the panel interface accepts Embedded DisplayPort input data.

3. The modular display monitor system of claim 1, wherein the panel interface accepts DisplayPort input data.

4. The modular display monitor system of claim 1, wherein the panel interface of the display panel is coupled to the connector module interface via a board-to-board data interface.

5. The modular display monitor system of claim 1, wherein the interchangeable connector module further comprises an alternating current to direct current adapter to provide power to the interchangeable display panel.

6. The modular display monitor system of claim 1, wherein the interchangeable connector module further comprises display panel control and processing electronics for image scaling, color decoding, and frame rate conversion to process video input data for display by the interchangeable display panel.

7. The modular display monitor system of claim 1, wherein the interchangeable connector module further comprises:
    an input interface that accepts video input data from an information handling system that is in Video Graphics Array format, Digital Visual Interface format, High-Definition Multimedia Interface format, or Display Port format, and
    wherein the interchangeable connector module further comprises electronics to convert the video input data format to Embedded DisplayPort format and transmit the video input data to the interchangeable display panel.

8. A modular display monitor system comprising:
    an interchangeable display panel having a panel interface and a reduced display panel control and processing capability;
    an interchangeable monitor riser having a mounting mechanism attachable to the interchangeable display panel;
    the mounting mechanism having a mounting mechanism data interface for interfacing with the panel interface;
    the interchangeable monitor riser having a cable connecting the mounting mechanism data interface to a base interface; and
    an interchangeable connector module without a CPU having a connector module interface for interfacing with the base interface of the interchangeable monitor riser, wherein the interchangeable connector module is disposed at the base of the interchangeable monitor riser; and wherein the interchangeable connector module contains display panel control and processing electronics to process video input data received from an information handling system having a CPU and to drive the interchangeable display panel.

9. The modular display monitor system of claim 8, wherein the panel interface accepts Embedded DisplayPort input data format.

10. The modular display monitor system of claim 8, wherein the panel interface accepts DisplayPort input data format.

11. The modular display monitor system of claim 8, wherein the panel interface of the interchangeable display panel is coupled to the mounting mechanism interface via a board-to-board data interface.

12. The modular display monitor system of claim 8, wherein the base interface of the interchangeable monitor riser is coupled to the connector module interface via a board-to-board data interface.

13. The modular display monitor system of claim 8, wherein the interchangeable connector module further comprises display panel control and processing electronics for image scaling, color decoding, and frame rate conversion to process video input data for display by the interchangeable display panel.

14. The modular display monitor system of claim 8, wherein the interchangeable connector module further comprises an input interface that accepts video input data from an information handling system that is in Video Graphics Array format, Digital Visual Interface format, High-Definition Multimedia Interface format, or Display Port format, and
    wherein the interchangeable connector module further comprises electronics to convert the video input data format to Embedded DisplayPort format and transmit the video input data to the interchangeable display panel.

15. An interchangeable connector module for use with a modular display monitor system, comprising:
    a video input data interface that accepts video input data from an information handling system that is in a first video input data format; and
    a connector module interface for transmitting video input data that is in a second video input data format to an interchangeable display panel having a reduced display panel processing capability;
    wherein the interchangeable connector module without a CPU comprises display panel control and processing electronics for driving display of an image on the interchangeable display panel, and
    wherein the interchangeable connector module is separately disposed from the interchangeable display panel and separately disposed from an information handling system having a CPU.

16. The interchangeable connector module of claim 15, wherein the display panel control and processing electronics further comprise electronics for image scaling.

17. The interchangeable connector module of claim 15, wherein the display panel control and processing electronics further comprise electronics for color decoding and frame rate conversion.

18. The interchangeable connector module of claim 15, wherein the first video input data format is Video Graphics Array format, Digital Visual Interface format, High-Definition Multimedia Interface format, or DisplayPort format.

19. The interchangeable connector module of claim 15, wherein the second video input data format is Embedded DisplayPort format.

20. The interchangeable connector module of claim 15, further comprising a connecting dock for attaching to an interchangeable monitor riser.

* * * * *